United States Patent [19]
Kornylak

[11] 3,881,789
[45] May 6, 1975

[54] CONVEYOR ROLLER AND BEARING SEAL

[75] Inventor: Andrew T. Kornylak, Hamilton, Ohio

[73] Assignee: Kornylak Corporation, Hamilton, Ohio

[22] Filed: June 8, 1973

[21] Appl. No.: 368,133

Related U.S. Application Data
[62] Division of Ser. No. 128,081, March 25, 1971, abandoned.

[52] U.S. Cl............................. 308/187.1; 308/36.1
[51] Int. Cl. ........................................... F16c 33/78
[58] Field of Search............ 308/36.1, 187.1, 187.2; 277/95, 208

[56] References Cited
UNITED STATES PATENTS

| | | | |
|---|---|---|---|
| 2,823,967 | 2/1958 | Harrington | 308/187.2 |
| 3,049,357 | 8/1962 | Kosatka | 277/208 |
| 3,119,624 | 1/1964 | Freed | 277/208 |
| 3,142,520 | 7/1964 | Mueller | 308/187.2 |
| 3,194,571 | 7/1965 | Peickii et al. | 277/208 |
| 3,203,511 | 8/1965 | Long, Jr. | 277/208 |
| 3,343,894 | 9/1967 | Fisher, Jr. | 308/187.2 |
| 3,346,307 | 10/1967 | Harrington | 308/187.1 |
| 3,489,468 | 1/1970 | Buck | 277/95 |

*Primary Examiner*—Charles J. Myhre
*Assistant Examiner*—R. H. Lazarus
*Attorney, Agent, or Firm*—Jay M. Cantor

[57] ABSTRACT

A conveyor roller comprising a hub and rim and a bearing seal therefor for preventing the escape of lubricant from the roller and avoiding contamination of the lubricant in the roller by the environment. The seal is a disc formed with a vertical surface to engage the hub, a peripheral flange forming a sealing lip to engage the rim, and grippers to grip the hub to prevent loss of the seal while the roller is manipulated during assembly on a track.

4 Claims, 4 Drawing Figures

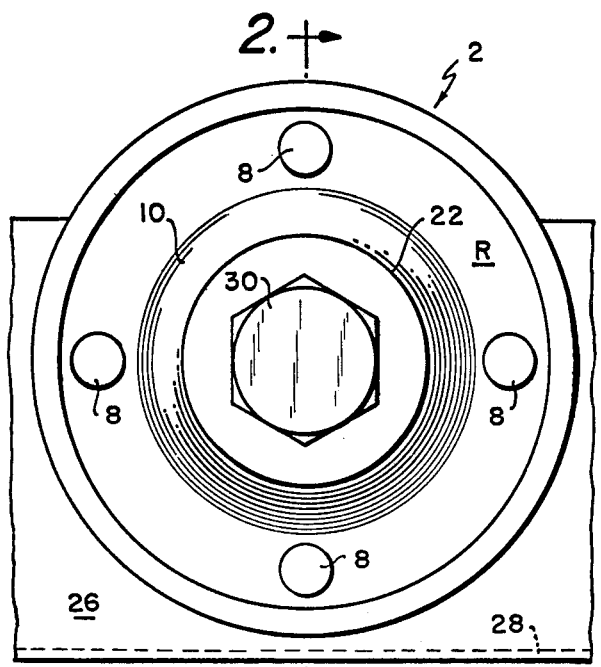
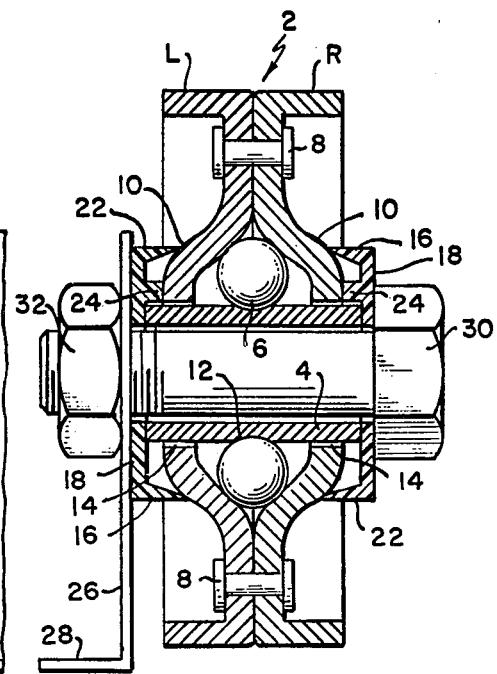
FIG. 1.  FIG. 2.
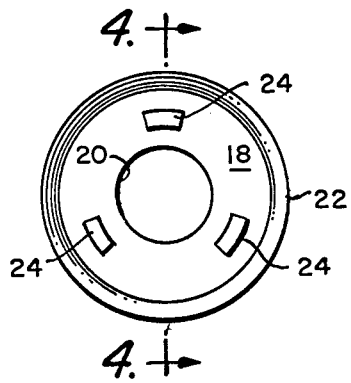
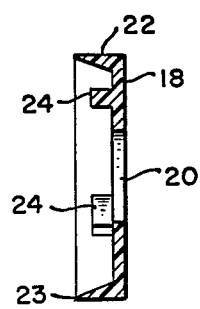
FIG. 3.  FIG. 4.

CONVEYOR ROLLER AND BEARING SEAL

This is a division of application Ser. No. 128,081, filed Mar. 25, 1971 now abandoned.

This invention relates to a bearing seal and more particularly to a bearing seal for a conveyor roller.

The type of conveyor in which this invention finds great utility comprises a pair of parallel tracks on which are mounted a series of rollers. Each roller consists of a hub and a rim rotatably mounted on the hub. The bearing which mounts the rim on the hub is supplied with a lubricant before assembly of the roller on the track and the seals are then applied to prevent the escape of the lubricant and avoid contamination of the lubricant by a dirty environment. The assembly of the seals on the rollers and the mounting of the assembly on the track requires a great degree of manual dexterity and often leads to the dropping of the seals from the rollers. Once a seal is dropped it must be discarded and replaced by a new seal if assembly is to proceed with a minimum amount of delay. It is therefore an object of this invention to provide a seal which can be firmly maintained on the roller during assembly operations.

It is a further object to provide a seal as aforesaid which will maintain the sealing function under conditions in which the rim wobbles with respect to the hub.

It is a further object of this invention to provide a seal as aforesaid which will be automatically centered on the hub as it is mounted.

It is a further object of this invention to provide a roller and seal assembly which can be handled as a unit during assembly.

These and other objects of the invention will become manifest upon reading the following description in conjunction with the accompanying drawings wherein:

FIG. 1 is a side elevation of the roller and seal of this invention,

FIG. 2 is a view partly in section taken on the line 2—2 of FIG. 1,

FIG. 3 is a side elevation of the seal, and

FIG. 4 is a section taken on the line 4—4 of FIG. 3.

With reference to the drawing there is disclosed a rim 2 mounted on a hub 4 by means of an antifriction bearing in the form of an annular series of balls 6.

The rim comprises a pair of similar members L and R secured together by rivets 8. Each member is bulged to form a seat for the balls and an annular surface 10 for cooperation with the lips of the seal.

The hub is in the form of a tube having a peripheral groove 12 forming a raceway for the balls 6 and extends beyond the hub to form gripping surfaces for the seal as set out more fully in the following description.

A clearance space 14 is provided between the rim and hub to provide for manufacturing tolerances and elimination of rubbing contact between the rim and hub.

Seals 16 are applied on the ends of the hub to preserve the lubricant which is in the space containing the balls and in the clearance space. Each seal consists of a disc portion 18 having a central bore 20, an annular lip 22 having a sharp edge 23 on the periphery, and three fingers 24 spaced 120° about the center of the disc. Each finger is in the form of a short arc and is disposed on a radius which is less than the radius of the outer surface of the hub. The seal is made of an elastomeric material and the fingers resiliently grip the outer surface of the hub to retain the seals while the assembly of roller and seals is manipulated in a manner to be positioned adjacent a wall 26 of a structural element such as an angle iron having a leg 28 and to be retained as a complete assembly while a bolt 30 is passed through the hub and through an opening in wall 26. A nut 32 is threaded onto the bolt to secure the assembly on the wall and to compress the seals against the hub. The hub, rim, and seal are so dimensioned that the sharp edge of the lip maintains sealing contact with surface 10 as the hub wobbles from one extreme angular position to the opposite extreme position.

The angular positioning of the fingers ensures that the lip is centered about the central axis of the hub.

The seal is preferably formed of a synthetic resilient plastic such as TEFLON but other materials which are resilient resistant to damage by the lubricant can be used.

I claim:

1. In combination, a roller comprising a rim, a hub having a central bore therein, said hub extending through and projecting beyond the ends of the rim, a bearing assembly rotatably mounting the rim on the hub with a clearance space therebetween, and means sealing said space on opposite sides of the rim, said sealing means each comprising a disc of elastomeric material having an opening of a diameter less than the outer diameters of the ends of the hub, a flexible annular lip having a greater diameter than the hub extending laterally from the periphery of the disc, at least three fingers extending from the wall of the disc in the same direction as the lip and being of a shorter length than the lip but of a length to extend along the projecting end of the hub and bear against the rim when the disc wall lies against the end of the hub, said fingers being equiangularly spaced concentrically about the axis of the bore on a radius slightly smaller than the outer periphery of the hub for gripping the hub when flexed outwardly, said fingers each being a short arc of elastomeric material with the concavity toward the axis and of a circumferential extent less than the spacing between adjacent fingers.

2. A roller as defined in claim 1 wherein the rim is formed with opposed annular outwardly bulged zones and the lips are in engagement with said zones.

3. A roller as defined in claim 1 wherein the disc, lip and fingers are formed of a unitary body of elastomer.

4. A roller as defined in claim 2 wherein the means bearing against the discs comprises a wall member bearing against one disc and having a bolt extending therefrom through said one disc and the hub, and a nut adjacent the other disc.

* * * * *